(12) United States Patent
Selvarajan et al.

(10) Patent No.: US 12,380,614 B2
(45) Date of Patent: Aug. 5, 2025

(54) SYSTEM AND METHOD FOR AUGMENTED REALITY BASED INDOOR NAVIGATION

(71) Applicant: Tata Consultancy Services Limited, Mumbai (IN)

(72) Inventors: Paul Singh Selvarajan, Chennai (IN); Roshini Jain, Chennai (IN); Pratik Parida, Chennai (IN); Balamurali Venkatesan, Chennai (IN); Srilakshmi Murali, Chennai (IN); Meril Sakaria, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 204 days.

(21) Appl. No.: 18/207,271

(22) Filed: Jun. 8, 2023

(65) Prior Publication Data
US 2023/0401770 A1    Dec. 14, 2023

(30) Foreign Application Priority Data
Jun. 8, 2022 (IN) .............................. 202221032867

(51) Int. Cl.
*G06T 11/20* (2006.01)
*G01C 21/20* (2006.01)
(Continued)

(52) U.S. Cl.
CPC .......... *G06T 11/206* (2013.01); *G01C 21/206* (2013.01); *G06K 7/1417* (2013.01); *G06T 7/73* (2017.01); *G06T 2207/30204* (2013.01)

(58) Field of Classification Search
CPC ............... G06T 11/206; G06T 7/73; G06T 2207/30204; G06T 19/006; G01C 21/206; G01C 21/3804; G06K 7/1417; H04W 4/33
See application file for complete search history.

(56) References Cited

U.S. PATENT DOCUMENTS

| | | | |
|---|---|---|---|
| 2015/0116356 A1* | 4/2015 | Alon | G06T 7/90 345/633 |
| 2020/0273235 A1* | 8/2020 | Emami | G06T 7/50 |
| 2020/0302510 A1* | 9/2020 | Chachek | G06V 20/52 |

FOREIGN PATENT DOCUMENTS

| | | |
|---|---|---|
| CN | 107782314 B | 2/2020 |
| CN | 111157009 A | 5/2020 |

(Continued)

*Primary Examiner* — Jeffery A Brier
(74) *Attorney, Agent, or Firm* — Finnegan, Henderson, Farabow, Garrett & Dunner, LLP

(57) ABSTRACT

The embodiments herein provide a method and system for an augmented reality based indoor navigation. The system creates an augmented reality (AR) based fingerprinting to perform the dynamic routing. A floor wise plan of the building is uploaded. The floor plan is converted to a floor plan graph. Then cloud anchors are created and placed across the floor. An anchor is a fixed position and orientation in the real world as recognized by any Augmented Reality (AR) device. Each time an anchor is placed, its position information is fingerprinted on the floorplan graph and that fingerprinting is saved in the database. When user scans for nearest QR code to identify their current position, the user location is identified and the planogram details, fingerprinting and pre-processed floorplan matrix are obtained from database. When user selects his destination, dynamic routing is performed to obtain shortest/optimized path viewed through augmented reality fingerprinting.

18 Claims, 5 Drawing Sheets

(51) Int. Cl.
*G06K 7/14* (2006.01)
*G06T 7/73* (2017.01)

(56) References Cited

FOREIGN PATENT DOCUMENTS

| CN | 111795688 A | 10/2020 |
| CN | 113340294 A | 9/2021 |

* cited by examiner

SYSTEM AND METHOD FOR AUGMENTED REALITY BASED INDOOR NAVIGATION

CROSS-REFERENCE TO RELATED APPLICATIONS AND PRIORITY

This U.S. patent application claims priority under 35 U.S.C. § 119 to Indian Application number 202221032867, filed on Jun. 8, 2022. The entire contents of the aforementioned application are incorporated herein by reference.

TECHNICAL FIELD

The disclosure herein generally relates to the field of indoor navigation and more specifically, to a method and system for an augmented reality based indoor navigation.

BACKGROUND

Today due to the advancement in technology, everyone can access Global Positioning System (GPS) for navigation. From suggesting the nearest gas station, the correct retail store findings, to tracking the vehicle location, GPS has made lives much easier. GPS is a satellite navigation system that displays location and time information in all weather conditions to the user, irrelevant of position. GPS technology uses satellites and ground stations that has made an impact on navigation and positioning needs of common people. GPS has the ability to track aircrafts, cars, cell phones, boats and even individuals that become a reality. These all refer to outdoor navigation that is easily possible with the help of GPS navigation.

However, when indoor navigation is referred, there comes the use of images and videos. GPS would not work as the signal gets attenuated or even blocked by walls, and the strength weakens. One of the biggest challenge today is to help people navigate within a big indoor environment like malls, museum, retail warehouses and big stores etc. Especially, when people are in a store, they tend to spend most of their time searching for a product/category while not able to connect with retail associates. This hampers the customer experience to a significant level and hence a proper and seamless navigation alternative is a requirement for a seamless customer experience.

SUMMARY

Embodiments of the disclosure present technological improvements as solutions to one or more of the above-mentioned technical problems recognized by the inventors in conventional systems. For example, in one embodiment, a method and system for an augmented reality based indoor navigation is provided.

In one aspect, a processor-implemented method for an augmented reality based indoor navigation is provided. The method includes one or more steps such as receiving, via an input/output interface, a floor plan of each floor of a predefined building and converting the floor plan into a floor plan graph. A pixel mapping is obtained by thresholding the floor plan graph. Further, a plurality of cloud anchors is placed across the floor. Herein, wherein each of the plurality of cloud anchors are hosted on the cloud. The floor plan graph is converted into a square matrix to obtain a logical sequence of the plurality of cloud anchors using Prim's technique. The plurality of cloud anchors is mapped onto the pixel mapping to create an augmented reality (AR) fingerprint and performing a dynamic routing to obtain an optimized path to a destination from a current location of user based on the AR fingerprint.

In another aspect, a system for an augmented reality based indoor navigation is provided. The system includes an input/output interface configured to receive a floor plan of each floor of a predefined building, wherein the floor plan is a scale diagram of the predefined building. Further, the system includes one or more hardware processors and at least one memory storing a plurality of instructions, wherein one or more hardware processors are configured to execute the plurality of instructions stored in at least one memory. Further, the system is configured to convert the floor plan into a floor plan graph. A pixel mapping is obtained by thresholding the floor plan graph. Further, a plurality of cloud anchors is placed across the floor. Herein, wherein each of the plurality of cloud anchors are hosted on the cloud. The floor plan graph is converted into a square matrix to obtain a logical sequence of the plurality of cloud anchors using Prim's technique. The plurality of cloud anchors is mapped onto the pixel mapping to create an augmented reality (AR) fingerprint and performing a dynamic routing to obtain an optimized path to a destination from a current location of user based on the AR fingerprint.

In yet another aspect, one or more non-transitory machine-readable information storage mediums are provided comprising one or more instructions, which when executed by one or more hardware processors causes a method for augmented reality based indoor navigation is provided. The method includes one or more steps such as receiving, via an input/output interface, a floor plan of each floor of a predefined building and converting the floor plan into a floor plan graph. A pixel mapping is obtained by thresholding the floor plan graph. Further, a plurality of cloud anchors is placed across the floor. Herein, wherein each of the plurality of cloud anchors are hosted on the cloud. The floor plan graph is converted into a square matrix to obtain a logical sequence of the plurality of cloud anchors using Prim's technique. The plurality of cloud anchors is mapped onto the pixel mapping to create an augmented reality (AR) fingerprint and performing a dynamic routing to obtain an optimized path to a destination from a current location of user based on the AR fingerprint.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
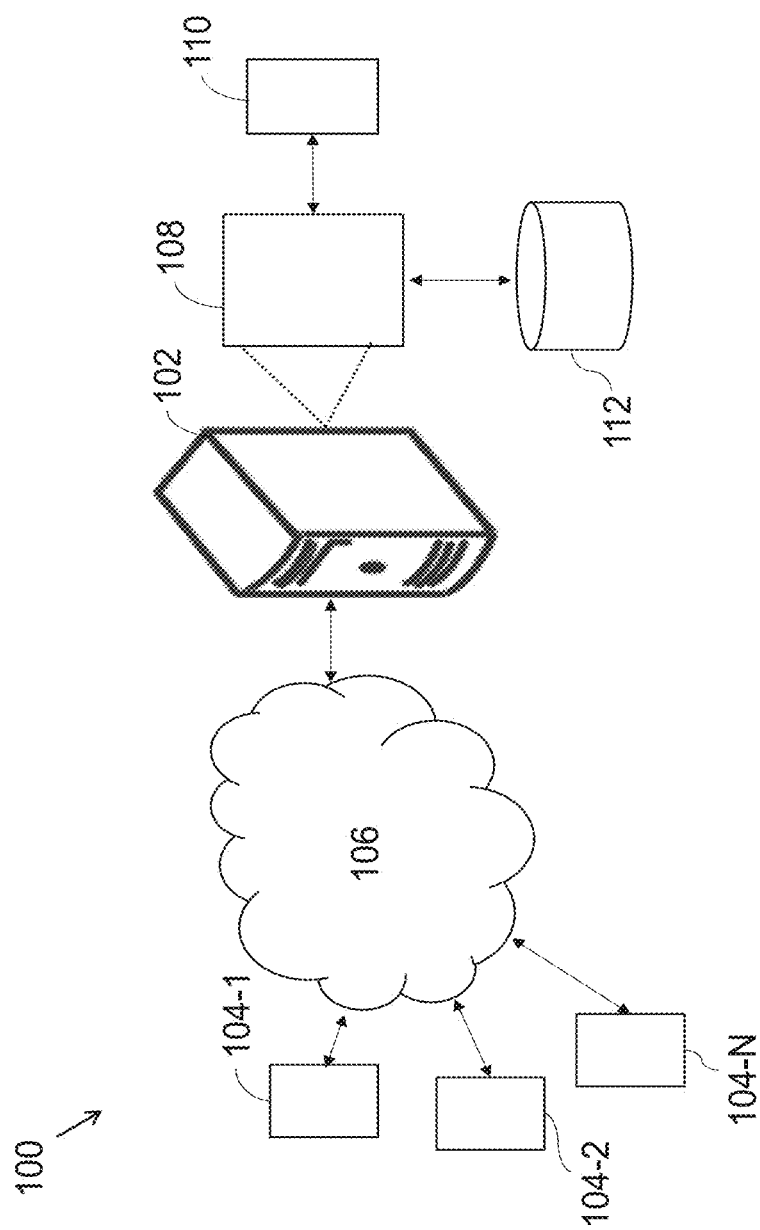
FIG. 1 illustrates a block diagram of an exemplary system for an augmented reality based indoor navigation, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for an augmented reality based indoor navigation. The proposed disclosure illustrates an augmented reality (AR) based fingerprinting. The system takes help of AR core as base to place cloud anchors and create a virtual navigation map for retailers to curate the available map and help users.

It is to be noted that most of the solutions today use external hardware infrastructure, like Li-Fi, WI-FI triangulation-based navigation, beacons etc. These solutions are heavily dependent on infrastructure and each has its own constraints when it comes to proper navigation inside stores. For example, BLE beacons, Wi-Fi triangulation, and Li-Fi led. The augmented reality based application does not need any hardware dependency. Less maintenance required when there are changes in map layout and planograms. Mobile phone with internet and AR core support is sufficient (today AR core is supported in almost all mobile). There will be one time effort by an admin to save all the anchors, if required, anchors can be modified or deleted.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates a block diagram of a system (100) for an augmented reality based indoor navigation, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory (110) with a plurality of instructions, one or more databases (112), and one or more hardware processors (108) which are communicatively coupled with the at least one memory to execute a plurality of instructions stored therein. The components and functionalities of the system (100) are described further in detail.

In one embodiment, the one or more I/O interfaces (104) are configured to receive a floor plan of each floor of a predefined building. The floor plan is a scale drawing of each floor of the predefined building. The scale drawing covering an entire top view of an indoor space highlighting different rooms/regions in the indoor space. The floor plan input given to the system (100) can be of any formats such as .png/.jpeg etc.

Further, the system (100) is configured to convert the floor plan into a floor plan graph. A pixel mapping is obtained by thresholding the floor plan graph. Each pixel of floor plan graph is normalized to 0 or 1. A plurality of cloud anchors is placed across the floor. Herein, each of the plurality of anchors are stored on the cloud storage and can be accessed by multiple users. Position information of each of the plurality of cloud anchors is fingerprinted on the floor plan graph and that fingerprinting is saved in a database.

In another embodiment, the floor plan graph is converted into a square matrix. Any image can be visualized as a 2D array of pixels. Each pixel is characterized by its (x, y) coordinates and its value. The value of each pixel is obtained by thresholding a floor plan image. Thresholding is a type of segmentation where the system (100) normalizes color image and converts it to binary image. Each pixel stores either 0 or 1 as its value. After marking the plurality of cloud anchors on walkable regions and connecting them, a predefined threshold is applied on the floorplan image to obtain a 2D array of 0s and 1s where 0 represents non-walkable region and 1 represents walkable region.

Figure 2:
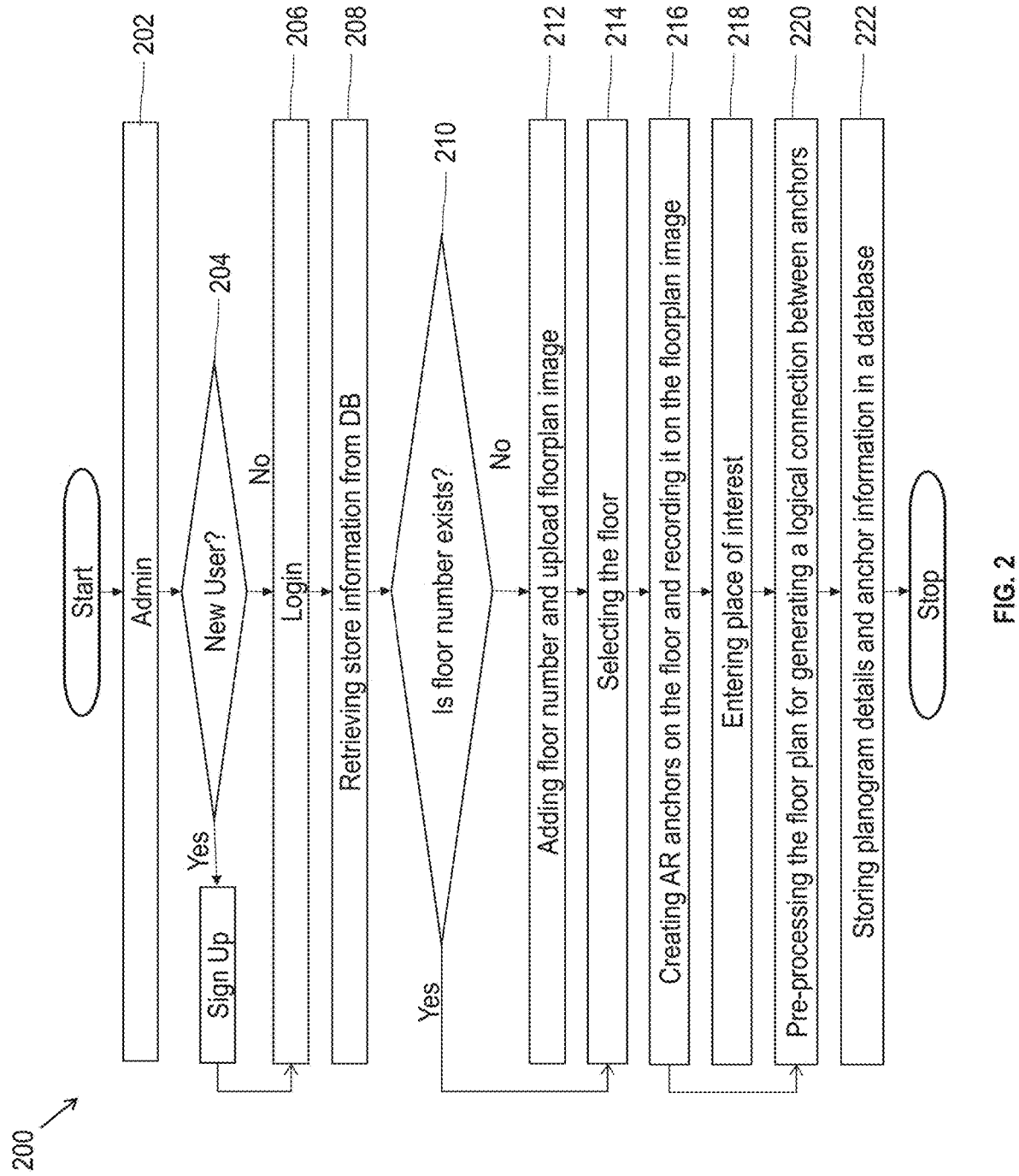
FIG. 2 is a functional flow diagram of the system for an admin to create an augmented reality fingerprint performing the dynamic routing, according to an embodiment of the present disclosure.

Referring FIG. 2, illustrating a functional flow diagram (200) of the system (100) for an admin 202 to create an augmented reality (AR) fingerprint (mapping of anchors onto the image floor map) to perform the dynamic routing, in accordance with an example embodiment. Herein, the system checks if the admin 202 is a new user or not at step 204. If the admin 202 is a new user, then, the admin is asked to sign up. Otherwise, the admin logs in at step 206. Next information stored in the database 112 is retrieved at step 208. Further, at step 210, the system checks if a floor number exists in the retrieved information. If the floor number doesn't exist, then, it is added and a floor plan image of the floor is uploaded at step 212. If the floor number exists, then, the admin can directly select the floor at step 214. Further, at step 216, AR anchors are created on the floor and recorded on the floorplan image. Following steps are performed to create the AR anchors: The floor plan is converted to a floor plan graph. A pixel mapping is obtained by thresholding the floor plan graph. Each pixel of floor plan graph is normalized to 0 or 1. Then cloud anchors are created and placed across the floor. It would be appreciated that an anchor is a fixed position and orientation in the real world as recognized by any Augmented Reality (AR) device. The cloud anchors are those that are hosted on the cloud and can be shared across multiple user sessions.

Each time the cloud anchor is placed, its position information is fingerprinted on the floorplan graph and that fingerprinting is saved in the database. Once this is done, the admin can enter a place of interest at step 218. Then, at step 220, the floor plan graph is pre-processed and converted into a square matrix. In the square matrix, all the cloud anchors are connected to their nearest cloud anchor and a logical sequence of cloud anchors is obtained using enhanced Prim's technique. The results are saved in a database (DB), along with the fingerprinting info (Anchor ID, pixel coordinate). An admin is also supposed to record the planogram details on the floorplan and save it at step 222. This is done by selecting a position on the floorplan and saving the planogram detail. The one or more pixel coordinates selected, and the planogram detail are then saved in the DB.

Figure 3:
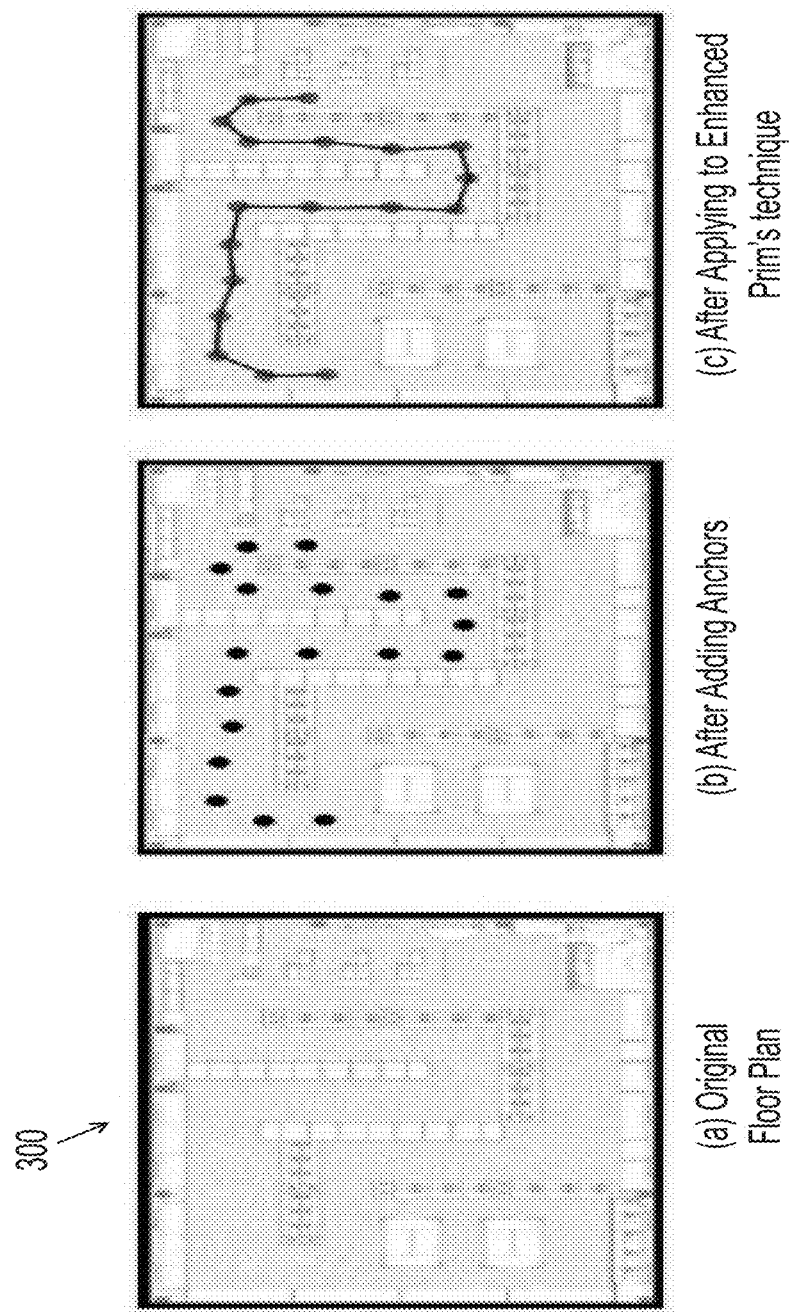
FIG. 3 is a schematic diagram illustrating a floor plan graph of an indoor space in (a) original form, (b) after applying anchor nodes, and (c) after applying to enhanced Prim's technique, according to an embodiment of the present disclosure.

Referring FIG. 3, a schematic diagram (300) illustrating the floor plan graph of an indoor space, in accordance with an example embodiment. Assuming FIG. 3 (*a*) is the original form of floor plan of the indoor space and FIG. 3 (*b*) represents cloud anchors created on the walkable regions of the indoor space. All the cloud anchors saved are connected to form a logical sequence as represented by FIG. 3 (*c*). A predefined threshold is applied to the floor plan image to obtain a 2D array of 0's and 1's. The 1's represents walkable region and 0's represents non-walkable region. The number of rows and columns in the 2D array corresponds to the height and width of the image in terms of pixels, respectively.

In another embodiment, the system (100) is configured to place a plurality of cloud anchors across the floor. Each of the plurality of cloud anchors are hosted on the cloud and can be shared across one or more users. Each of the plurality of cloud anchors are connected to a nearest cloud anchor. The system (100) obtains a logical sequence of the plurality of cloud anchors using a Prim's technique. The logical sequence is saved in a predefined database along with the fingerprinting information such as cloud anchor identity (ID), pixel coordinate. The system (100) also records planogram details on the floor plan. The planogram is a schematic plan for displaying products on floor to increase products visibility and boost sales. It helps in strategizing where new products should be placed. It also helps in ensuring that the most popular and profitable brand or product in the building is given proper limelight. Finally, the one or more pixel coordinates selected, and the planogram details are then saved in the predefined database.

Further, the system (100) maps the plurality of cloud anchors onto the pixel mapping to create an augmented reality fingerprint. An anchor is a fixed location and orientation in the real world as recognized by any augmented reality. A virtual object (a 3D object or a 2D image or a text) can be rendered on the anchor. A cloud anchor is the anchor hosted in the cloud. They can be resolved by multiple users to establish a common frame of reference across users and their devices.

The cloud anchors are generally used for a shared augmented reality experience where two or more devices can view the virtual objects at the same time. The virtual object that is placed or rendered on top of the cloud anchor. It is to be noted that the anchors are trackable position and their orientation are recognized by the AR devices. The anchor node is a virtual object rendered on the cloud anchor or location data. Further, a logical sequence of the cloud anchors is done to connect all cloud anchors created and obtain walkable and non-walkable regions of the floor on a high level. It is assumed that the cloud anchors are created and saved on all walkable and non-walkable regions. When all cloud anchors are connected, automatically they would lie on walkable path.

In one example, wherein a user wants to navigate from source A to destination B, a shortest path is obtained by processing the walkable path and cloud anchors lying on the shortest path between A and B will be rendered. Currently, the logical sequencing of cloud anchors is done by enhancing Prim's technique. By doing this logical sequencing of cloud anchors, the system (100) obtains a logical map or relation between cloud anchors. It also helps in automatically distinguishing the walkable regions from non-walkable regions.

Figure 4:
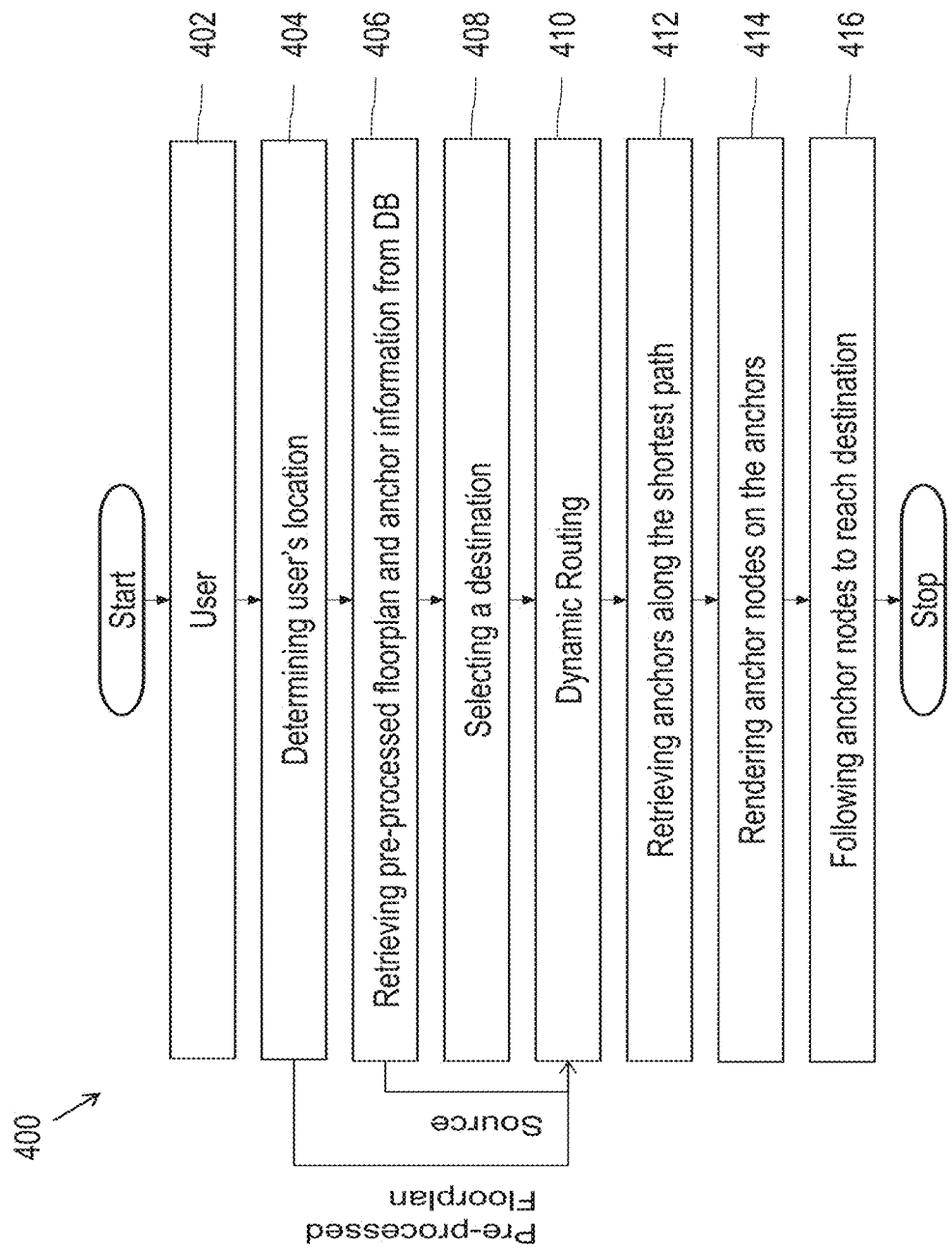
FIG. 4 is a flow diagram illustrating a dynamic routing for an optimized path within an indoor space, according to an embodiment of the present disclosure.

Referring FIG. 4, a functional flow diagram (400) illustrating a dynamic routing for an optimized path within an indoor space, according to an embodiment of the present disclosure. The system (100) is configured to perform a dynamic routing to obtain an optimized path to a destination from a current location of the user based on the AR fingerprint. It would be appreciated that when the user scans for nearest QR code to identify their current position, the user location is identified and the planogram details, fingerprinting and pre-processed floorplan matrix are obtained from the predefined database (DB). When the user selects his destination, the dynamic routing is performed to obtain the shortest/optimized path viewed through the augmented reality fingerprinting.

In another embodiment, on the user side, the user 402 scans for nearest QR Code to identify their current position. When the users' location is identified at step 404, the planogram details, fingerprinting and pre-processed floorplan matrix are obtained from the DB at step 406. When the user selects his destination at step 408, dynamic routing is performed at step 410 to obtain the shortest/optimized path viewed through this AR fingerprinting solution. The cloud anchors along the shortest path as computed by the dynamic router is retrieved from the DB at step 412. Anchor nodes for the cloud anchors along the shortest path are created and rendered at step 414 for the user to follow and reach his destination at step 416.

In another example, wherein if there are five sections in a retail store, using a static navigation route $^5C_2$ combination of paths will be created between all the five sections. It means there will be ten different paths which might not be necessary. Using the routing mechanism, one smart navigation route within these five sections aiming the optimal route within each other by placing the minimum cloud anchors needed for the same. From the start there is a need to place cloud anchors and identify all the points of interest while placing the cloud anchors.

Figure 5:
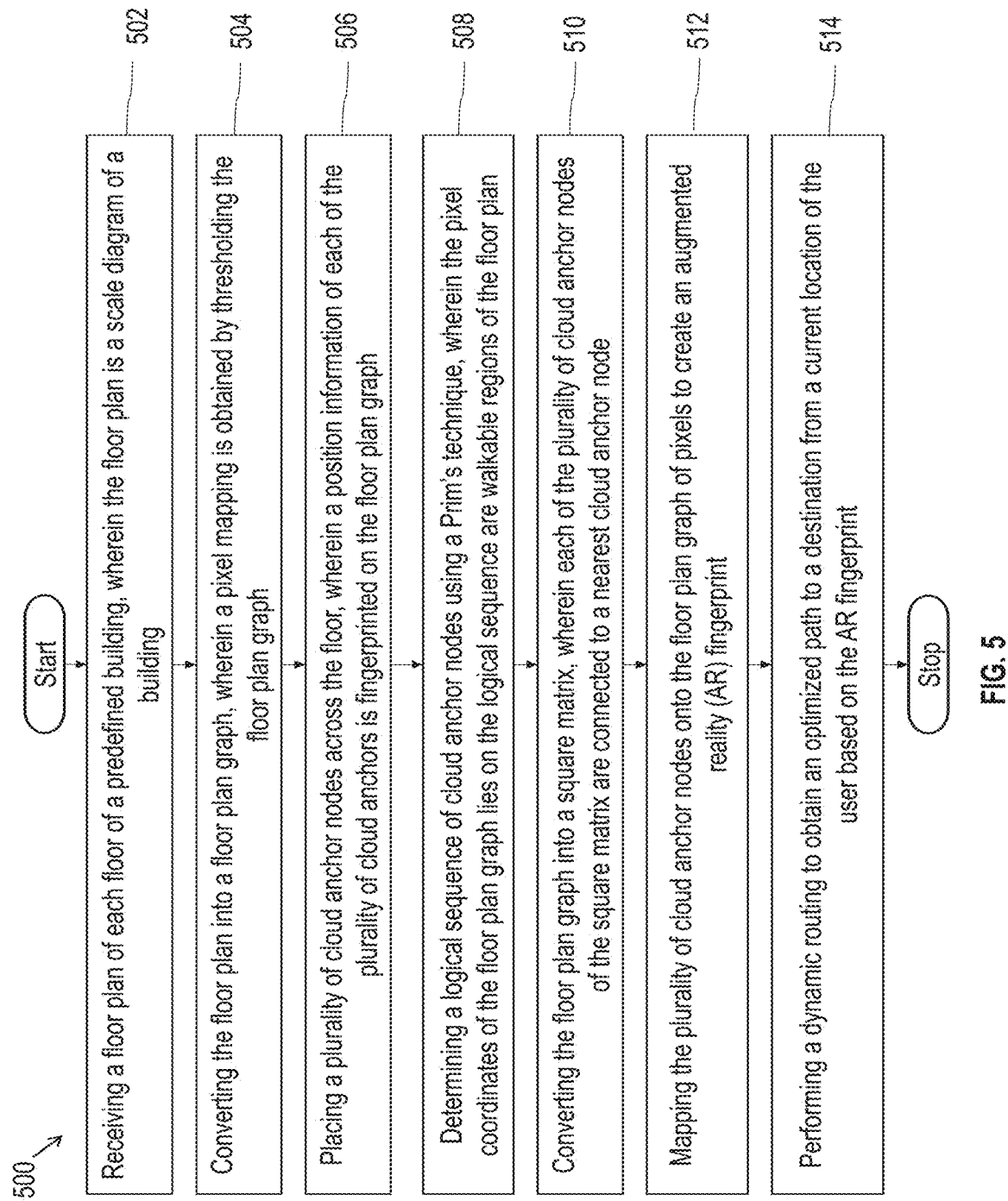
FIG. 5 is a flow diagram to illustrate a method for an augmented reality based indoor navigation, according to an embodiment of the present disclosure.

Referring FIG. 5, to illustrate a processor-implemented method (500) for an augmented reality based indoor navigation is provided. A floor wise plan of the building is uploaded. The floor plan is converted to a floor plan graph. Then cloud anchors are created and placed across the floor. An anchor is a fixed position and orientation in the real world as recognized by any Augmented Reality (AR) device. Each time an anchor is placed, its position information is fingerprinted on the floorplan graph and that fingerprinting is saved in the database. When user scans for nearest QR code to identify their current position, the user location is identified and the planogram details, fingerprinting and pre-processed floorplan matrix are obtained from database. When user selects his destination, dynamic routing is performed to obtain shortest/optimized path viewed through augmented reality fingerprinting.

Initially, at the step (502), receiving, via an input/output interface, a floor plan of each floor of a predefined building, wherein the floor plan is a scale diagram of a building.

At the next step (504), converting the floor plan into a floor plan graph. A pixel mapping is obtained by thresholding the floor plan graph. Each pixel of floor plan graph is normalized to 0 or 1.

At the next step (506), placing a plurality of cloud anchors across the floor, wherein each of the plurality of cloud anchors are hosted on the cloud and can be shared across one or more users.

At the next step (508), determining a logical sequence of the plurality of cloud anchors using a Prim's technique, wherein the one or more pixel coordinates of the floor plan graph lie on the logical sequence are walkable regions of the floor plan.

At the next step (510), converting the floor plan graph into a square matrix, wherein each of the plurality of cloud anchors of the square matrix are connected to a nearest cloud anchor.

At the next step (512), mapping the logical sequence of the plurality of cloud anchors onto the pixel mapping to create an augmented reality (AR) fingerprint. Each time a cloud anchor is placed, its position information is fingerprinted on the floor plan graph and that fingerprinting is saved in a database.

At the last step (514), performing a dynamic routing to obtain an optimized path to a destination from a current location of the user based on the AR fingerprint.

It would be appreciated that an enhanced shortest path technique fetches the pre-processed floorplan data which is a 2D array of 0s and 1s from a predefined database (DB). 1's represents that the coordinate lies in the logical sequence of cloud anchors obtained by Prim's technique. All coordinates that lie on the logical sequence are walkable. Thus, 1 represents a walkable region and 0's represents a non-walkable region. For the given source and destination, the enhanced shortest path technique finds the shortest path and returns it to a dynamic router. The dynamic router then checks for cloud anchors that lie on the shortest path returned by the enhanced shortest path technique and returns those cloud anchors to the user.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of navigation within an indoor environment. Further, most of the solutions today use external hardware infrastructure, like Li-Fi, WI-FI triangulation-based navigation, beacons etc. These solutions are heavily dependent on infrastructure, and each has its own constraints when it comes to proper navigation inside stores. For example, BLE beacons, Wi-Fi triangulation, and Li-Fi led based.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method comprising:
receiving, via an input/output interface, a floor plan for each of the one or more floors of a predefined building, wherein the floor plan is a scale diagram of each of the one or more floors of the predefined building;
converting, via one or more hardware processors, the floor plan into a floor plan graph, wherein a pixel mapping is obtained by thresholding the floor plan graph;
placing, via the one or more hardware processors, a plurality of cloud anchors across the floor, wherein a position information of each of the plurality of cloud anchors is fingerprinted on the floor plan graph;
determining, via the one or more hardware processors, a logical sequence of the plurality of cloud anchors using a Prim's technique;
converting, via the one or more hardware processors, the floor plan graph into a square matrix, wherein each of the plurality of cloud anchors of the square matrix are connected to a nearest cloud anchor;
mapping, via the one or more hardware processors, the logical sequence of the plurality of cloud anchors to the pixel mapping to create an augmented reality (AR) fingerprint; and
performing, via the one or more hardware processors, a dynamic routing to obtain an optimized path to a destination from a current location of a user based on the created AR fingerprint.

2. The processor-implemented method of claim 1, wherein the current location of the user is identified based on an outcome of quick response (QR) code scanned by the user.

3. The processor-implemented method of claim 1, wherein the floor plan is a scale drawing of the predefined building covering an entire top view of an indoor space and highlighting different regions in the indoor space.

4. The processor-implemented method of claim 1, wherein the plurality of cloud anchors is marked on walkable regions of the floor plan.

5. The processor-implemented method of claim 1, wherein the one or more pixel coordinates of the floor plan graph lie on the logical sequence are walkable regions of the floor plan.

6. The processor-implemented method of claim 1, wherein each time a cloud anchor is placed, its position information is fingerprinted on the floor plan graph and that fingerprinting is saved in a database.

7. The processor-implemented method of claim 1, wherein each of the plurality of cloud anchors are hosted on a cloud server and shared across one or more users.

8. A system comprising:
an input/output interface to receive a floor plan of each floor of a predefined building, wherein the floor plan is a scale diagram of a building;
a memory in communication with the one or more hardware processors, wherein the one or more hardware processors are configured to execute programmed instructions stored in the memory to:
convert the floor plan into a floor plan graph, wherein a pixel mapping is obtained by thresholding the floor plan graph;
place a plurality of cloud anchors across the floor, wherein a position information of each of the plurality of cloud anchors is fingerprinted on the floor plan graph;
determine a logical sequence of the plurality of cloud anchors using a Prim's technique, wherein the one or more pixel coordinates of the floor plan graph lie on the logical sequence are walkable regions of the floor plan;
convert the floor plan graph into a square matrix, wherein each of the plurality of cloud anchors of the square matrix are connected to a nearest cloud anchor;
map the logical sequence of the plurality of cloud anchors to the pixel mapping to create an augmented reality (AR) fingerprint, wherein each time a cloud anchor is placed, its position information is fingerprinted on the floor plan graph and that fingerprinting is saved in a database; and
perform a dynamic routing to obtain an optimized path to a destination from a current location of the user based on the AR fingerprint.

9. The system of claim 8, wherein the current location of the user is identified based on an outcome of quick response (QR) code scanned by the user.

10. The system of claim 8, wherein the floor plan is a scale drawing of a building covering an entire top view of an indoor space and highlighting different regions in the indoor space.

11. The system of claim 8, wherein the plurality of cloud anchors is marked on walkable regions of the floor plan.

12. A non-transitory computer readable medium storing one or more instructions which when executed by one or more processors on a system, cause the one or more processors to perform method comprising:
receiving, via an input/output interface, a floor plan for each of the one or more floors of a predefined building, wherein the floor plan is a scale diagram of each of the one or more floors of the predefined building;
converting the floor plan into a floor plan graph, wherein a pixel mapping is obtained by thresholding the floor plan graph;
placing a plurality of cloud anchors across the floor, wherein a position information of each of the plurality of cloud anchors is fingerprinted on the floor plan graph;
determining a logical sequence of the plurality of cloud anchors using a Prim's technique;
converting the floor plan graph into a square matrix, wherein each of the plurality of cloud anchors of the square matrix are connected to a nearest cloud anchor;
mapping the logical sequence of the plurality of cloud anchors to the pixel mapping to create an augmented reality (AR) fingerprint; and
performing a dynamic routing to obtain an optimized path to a destination from a current location of a user based on the created AR fingerprint.

13. The non-transitory computer readable medium of claim 12, wherein the current location of the user is identified based on an outcome of quick response (QR) code scanned by the user.

14. The non-transitory computer readable medium of claim 12, wherein the floor plan is a scale drawing of the predefined building covering an entire top view of an indoor space and highlighting different regions in the indoor space.

15. The non-transitory computer readable medium of claim 12, wherein the plurality of cloud anchors is marked on walkable regions of the floor plan.

16. The non-transitory computer readable medium of claim 12, wherein the one or more pixel coordinates of the floor plan graph lie on the logical sequence are walkable regions of the floor plan.

17. The non-transitory computer readable medium of claim 12, wherein each time a cloud anchor is placed, its position information is fingerprinted on the floor plan graph and that fingerprinting is saved in a database.

18. The non-transitory computer readable medium of claim 12, wherein each of the plurality of cloud anchors are hosted on a cloud server and shared across one or more users.

* * * * *